F. J. MACKIN.
AUTOMATIC GLASS MOLDING APPARATUS.
APPLICATION FILED AUG. 29, 1907.
904,975.
Patented Nov. 24, 1908.
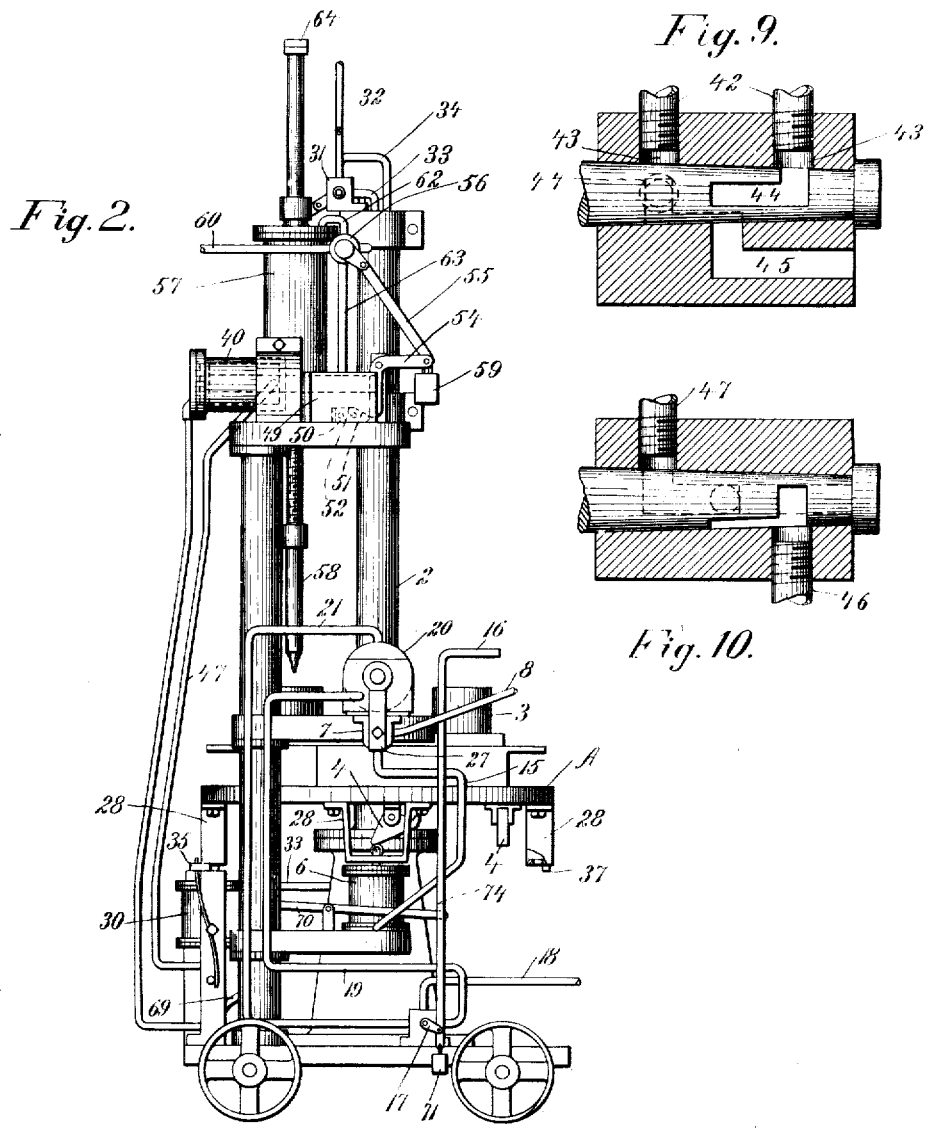

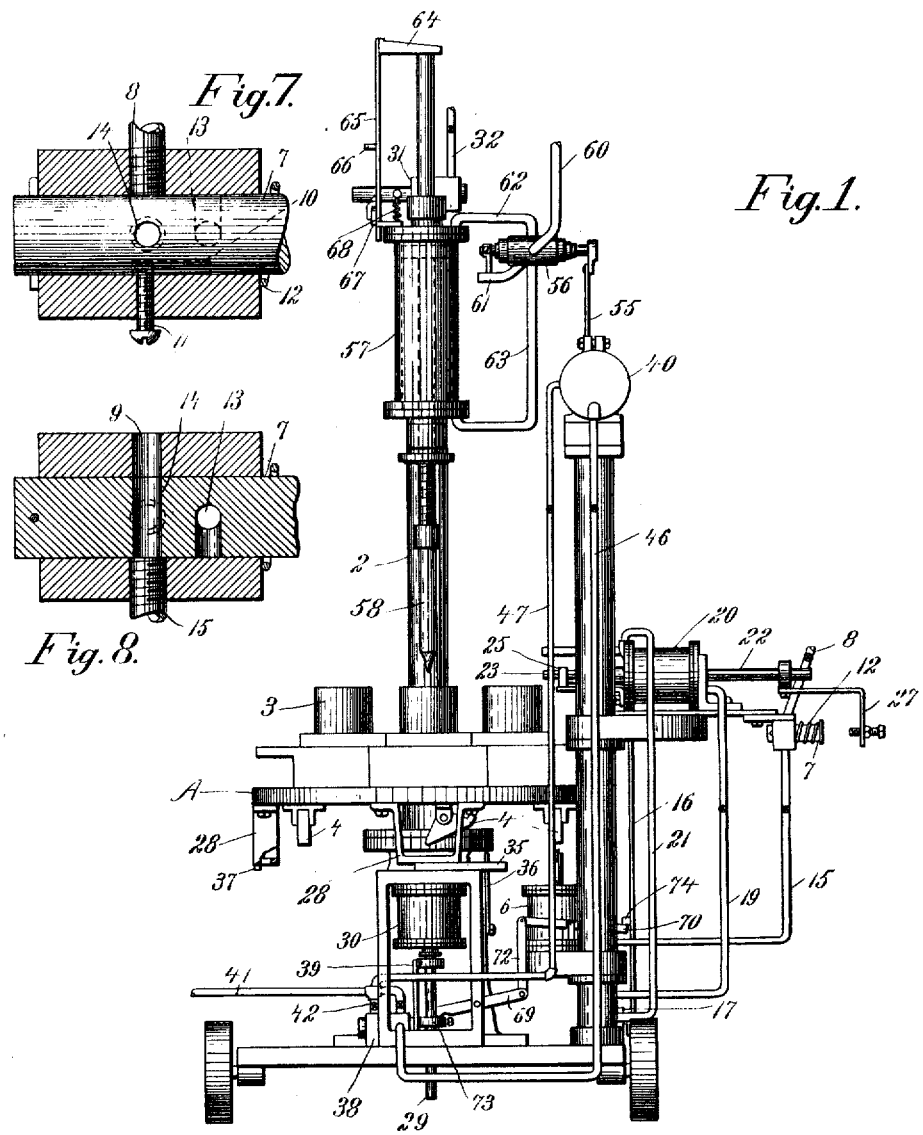

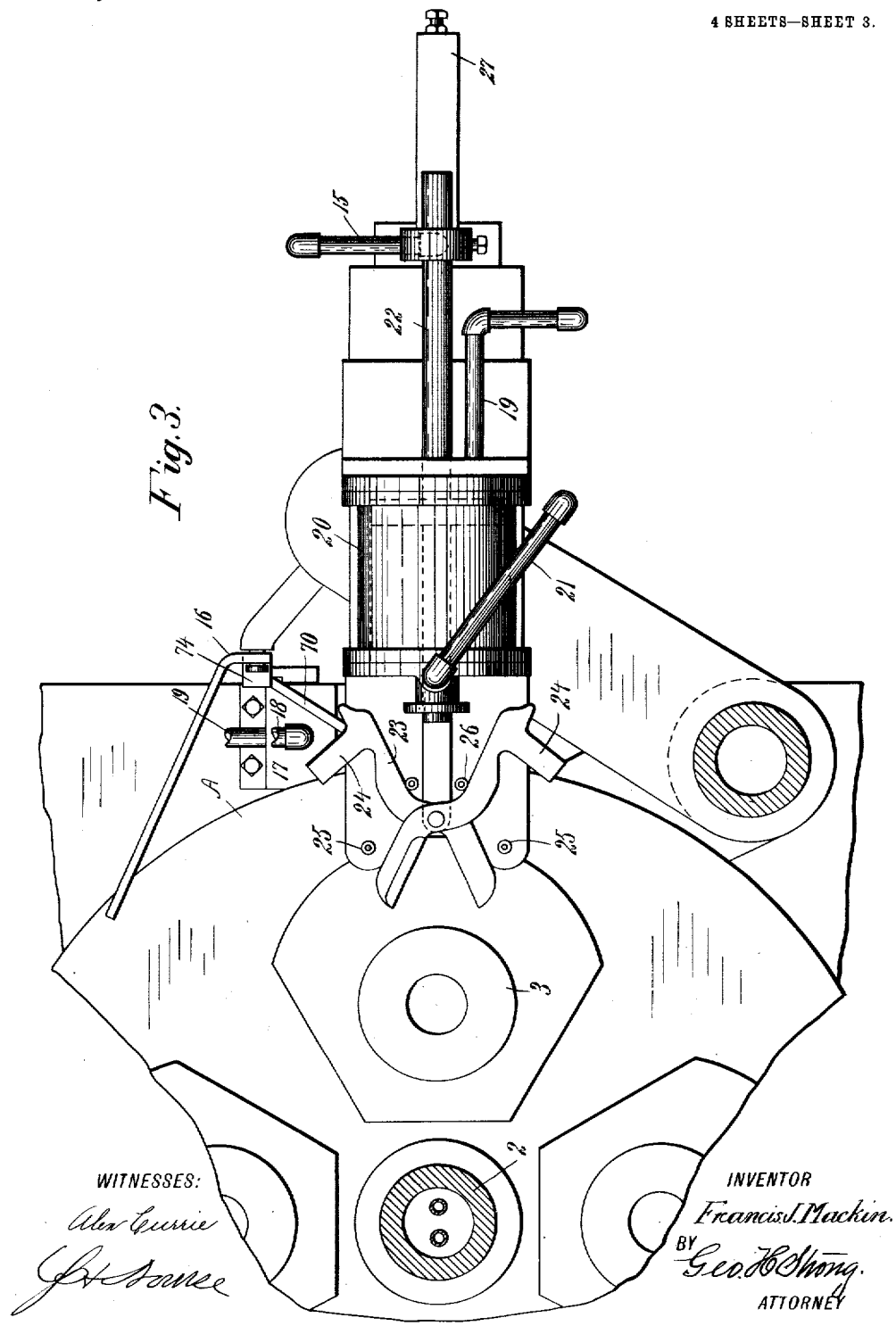

F. J. MACKIN.
AUTOMATIC GLASS MOLDING APPARATUS.
APPLICATION FILED AUG. 29, 1907.
904,975.
Patented Nov. 24, 1908.
4 SHEETS—SHEET 4.
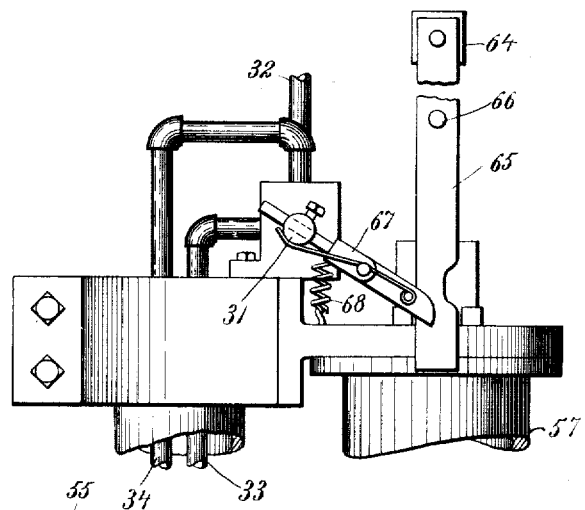
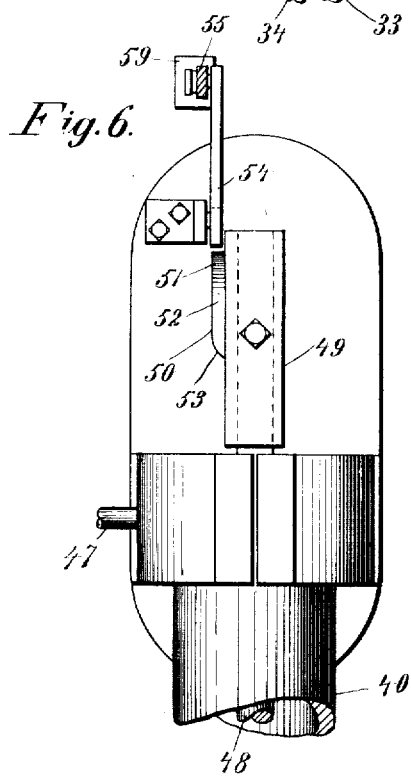
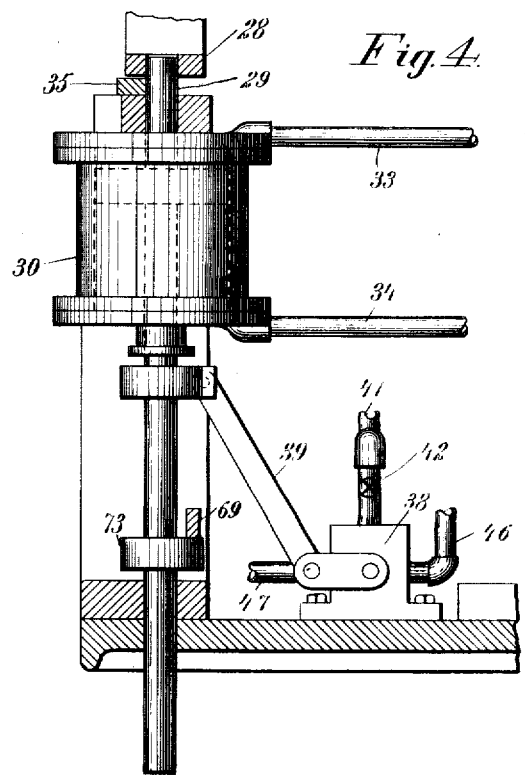
WITNESSES:
INVENTOR
Francis J. Mackin.
BY
Geo. H. Strong.
ATTORNEY

UNITED STATES PATENT OFFICE.

FRANCIS J. MACKIN, OF SAN FRANCISCO, CALIFORNIA, ASSIGNOR OF ONE-HALF TO ILLINOIS-PACIFIC GLASS CO., OF SAN FRANCISCO, CALIFORNIA, A CORPORATION.

AUTOMATIC GLASS-MOLDING APPARATUS.

No. 904,975.   Specification of Letters Patent.   Patented Nov. 24, 1908.

Application filed August 29, 1907. Serial No. 390,578.

*To all whom it may concern:*

Be it known that I, FRANCIS J. MACKIN, citizen of the United States, residing in the city and county of San Francsico and State of California, have invented new and useful Improvements in Automatic Glass-Molding Apparatus, of which the following is a specification.

My invention relates to glass molding machinery.

The object of the invention is to provide an automatic machine which will sever the glass deposited in the mold by the gatherer, advance the mold to the plunger, operate the plunger to set the glass, and provide means for regulating the length of time of setting; furthermore, to provide such an automatic machine which shall be under the control of the gatherer, and will work fast or slow, according as the gatherer works fast or slow.

Heretofore any machines approaching the automatic type have been so constructed that they required the gatherer to time his movements to those of the machine; that is, the movements of the machine were perfectly regular, and if the gatherer was a slow worker he would have to work under high tension in order to keep up with the machine, or else, as was frequently the case, a mold would go by without receiving any gather. In my machine the operator can accommodate the movements of the machine to his, so that he may work at a natural speed; or, if desired, the machine will operate itself. All this will be more fully explained hereinafter.

Another feature about prior molding machines is that the length of time that the plunger remained in the mold depended always on the operator; and sometimes the action of the plunger was either too fast or too slow, so that the glass in the mold did not become properly set. With my machine the length of set can be regulated to the particular work in hand, so that the operations thenceforth will be uniform.

Other objects and advantages of my improved automatic machine will be made apparent hereinafter.

The invention consists of the parts and the construction and combination of parts as hereinafter more fully described and claimed, having reference to the accompanying drawings, in which—

Figure 1 is a side elevation of the machine. Fig. 2 is a similar view at right angles to that of Fig. 1. Fig. 3 is a detail in plan of the shears and their actuating mechanism. Fig. 4 is a detail in elevation and partial section of the valve gear for operating the cam cylinder. Fig. 5 is a detail in elevation of the valve mechanism for operating the index cylinder. Fig. 6 is a detail in plan of the operating end of the cam cylinder. Figs. 7—8 are details of the valve for operating the kicker. Figs. 9—10 are details of the valve for operating the cam cylinder.

A represents a rotary table suitably mounted and supported for rotation about the central column 2 in a horizontal plane, and carrying any desired number of appropriate glass molds 3. On the under side of the table, and arranged relative to each mold, is a pivoted triangular cam 4, having a limited oscillating movement, and adapted normally to stand over a roller on the kicker-bar 5. By suitably actuating the kicker-bar upward, to cause the roller on the kicker-bar to impinge on the lower inclined surface of a cam block 4, the table is given a rotary forward movement. Suitable stop mechanism is provided to limit the rotary movement of the table, so that at each upward actuation of the kicker-bar the table will move just one space forward. All this will be shortly explained.

The kicker 5 is connected to a piston which operates in the kicker cylinder 6, and a suitable motive fluid, such as compressed air, is admitted to the lower end of the cylinder 6 by the valve 7 (Figs. 1—7—8) to reciprocate the kicker in the desired manner. The valve 7 is a one-way valve with a single inlet port 13 adapted to bring the supply pipe 8 periodically to register with the delivery pipe 15. The valve plug has a groove 10 with which a guide screw 11 engages, to prevent rotation of the valve plug, and to limit its reciprocating movement.

A spring 12 operates on the plug normally to carry the inlet port 13 in the plug out of register with the inlet port leading from pipe 8, and to bring the exhaust port 14 in the plug into register with pipe 15 and the exhaust port 9 in the valve casing, as shown in Fig. 7. Pushing in on the valve plug to compress spring 12, will bring port 13 into register with the supply pipe 8, and the delivery pipe 15, which conducts the air to the lower end of the cylinder to lift the kicker and revolve the table. Releasing the tension on the spring 12 shuts off the air from the supply 8, opens the exhaust, and the kicker falls by gravity.

The valve 7 is controlled by the mechanism which cuts off the gather, as will now be explained. When the skilled operator, known as the "gatherer," deposits the gather in the mold he presses down on a rod 16, which operates a two-way valve 17, which I term the main valve. Pushing down on the rod 16 and opening valve 17, permits air from the supply pipe 18 to pass through a delivery pipe 19 to the rear end of the shears cylinder 20 and operate the shears, and also operate the valve 7. When the valve 17 is reversed, the motive fluid is admitted through a pipe 21 to the opposite end of the cylinder 20, to move its piston and its piston-rod 22 in the opposite, or outward, direction.

By reference to Fig. 3, it will be observed that the piston-rod 22 in the shears cylinder 20 extends through both heads of the cylinder. The forward or inner end of the piston-rod is pivotally connected with the shears 23. These shears 23 are pivoted between their ends, and their handle portions have the cam projections 24 which are adapted, when the piston 22 is moved forward, to engage the fixed pins or rollers 25 and close the shears. The inner adjacent sides of the handles present cam surfaces which are adapted, when the piston-rod is moved in the opposite direction, to engage corresponding pins or rollers 26, to open the shears. Thus it will be observed that upon admitting the motive fluid through pipe 19 to move the piston in cylinder 20 in one direction, the shears will be closed; and that upon reversing the piston by the admission of air through the pipe 21, the shears will be opened; the exhaust through the pipes 19—21 taking place through the valve 17 in a manner well known in the art.

Simultaneous with the depositing of the gather in a mold which has previously been brought into position under the shears, and the actuation of the shears to cut off the gather, an adjustable trip member 27 on the outer end of the piston-rod 22 will engage the valve 7 to open it and admit air through the pipe 15 to the lower end of the kicker cylinder to raise the kicker 5, and by its action against the cam 4 above, give motion to the table. The return movement of the kicker 5, however, is delayed, and it operates as a stop in the path of the succeeding cam 4 to help arrest the movement of the table.

When the table is moved one mold space, the bracket 28 on the under side of the table is brought into position over the index-bar 29, so that when the index-bar is lifted, the latter will enter the perforations in the under side of the bracket 28, and so effectually lock the table for the time being, against rotative movement. This index-bar or rod is connected to a piston in the index cylinder 30. The air is admitted to this cylinder to reciprocate the index-rod through the two-way valve 31 (Fig. 5) from the supply pipe 32. From the valve 31 lead two pipes 33 and 34, respectively, to the upper and lower ends of the index cylinder 30 (Fig. 4). The manner of operating the valve 31 will be explained later.

Whenever the air is admitted through 33 to the top of the piston in the index cylinder 30, the index-rod 29 is withdrawn from engagement with a bracket 28, whereupon a spring-actuated, pivoted stop-plate 35 (Figs. 4 and 1) swings in over the depressed index-rod 29 to bar the upward movement of the latter until the right moment; the spring 36 normally acting on the latch 35 to push it into such stop position. It is understood that the oscillating movement of the pivoted latch member 35 is limited by suitable pins, or other means, not necessary here to be shown. When a bracket 28 comes along, a projection, as 37, on the under side of the bracket, pushes the latch member 35 out of the way, so that the compressed air in the lower end of the cylinder 30 may force the index-rod 29 upward to engage the perforation in the bracket 28 at the right time, and lock the table. Meanwhile, the kicker 5 has remained in elevated position, and it also acts as a stop against which a pivoted cam 4 has engaged. At that moment the air in the kicker cylinder 6 is released, whereupon the kicker falls by gravity; and, as is shown in Fig. 2, the cam 4, being properly counterbalanced, swings over the kicker 5 in readiness for the next upward actuation of the kicker. These cams 4, and their conjunctive arrangement with the kicker, constitute important features of the present invention; likewise does also the actuation of the index by fluid pressure means.

Except during the short interval that the valve 31 is turned to exhaust through pipe 34, and admit live air through pipe 33 to the top of the cylinder 30, for the purpose of depressing the index-rod and catching it by the latch 35, there is a pressure continually exerted through pipe 34 to lift the index-rod. Consequently, the moment the latch 35 is tripped the index-rod 29 flies up to interlock with the bracket 28, stopping the table. In this upward movement of the index-rod 29 (which latter extends through the head of the cylinder and is suitably guided below the cylinder, as shown in Fig. 4) a four-way valve 38 is opened; said valve having suitable connections 39 with a collar on the lower end of the index-rod 29. This valve 38 controls the admission and exhaust to opposite ends of the cam cylinder 40. The details of this valve 38 are shown more clearly in Figs. 9 and 10.

The air supply 41 has two valved branches 42 leading to corresponding inlets 43 in the valve casing. The plug of valve 38 has two peripheral angular grooves 44 corresponding to the inlets 43, and also corresponding to a common exhaust port 45 in the valve casing. When the plug of valve 38 is turned in one position, to admit air from one port 43 to a corresponding port 44, the other port 44 will be turned into exhaust position with the exhaust port 45, and vice versa. Thus, when the valve 38 is turned as it is by the up movement of the index-rod 29 (Figs. 4—2—1) live air is admitted through pipe 46 to the rear end of the cam cylinder 40, and exhaust is allowed to take place from the opposite end of the cylinder 40 through the pipe 47 and exhaust port 45. The piston-rod 48 of the cylinder 40 carries a block 49, which is detachably secured to a cam 50. This cam 50 has a rearwardly and upwardly inclined cam surface 51, a horizontal top surface 52, and an outwardly and frontwardly beveled rear end 53. A bell-crank lever 54, loosely fulcrumed at its angle to a fixed support, is hung with its lower arm in the path of the cam 50. The opposite end of the lever connects by a link 55 with the mold cylinder valve 56, which latter is a four-way valve. When air is let into the rear end of cylinder 40, the cam 50 is moved forward to rock the bell-crank, open valve 56, and allow the air to pass into the top of the mold cylinder 57. This causes the downward movement of the mold plunger 58 into a mold which has been brought into axial line with the plunger and locked in position by the index-bar 29 after the mold has received its gather, and the gather has been cut off by the shears 23. The length of time that the mold plunger takes to go down into the mold, and remains in the mold, corresponds to the length of time that the bell-crank 54 is in engagement with the cam surfaces 51—52; and this length of time may be controlled and varied by the amount of air let in through pipe 46, by simply throttling, more or less, the air passing through the corresponding branch 42.

While there is nothing new in the specific valve construction shown in Figs. 9 and 10, the novelty which marks an important step in this invention is in the controlling and varying of the motive fluid to the opposite ends of the cam cylinder 40; and, as before stated, this control and variation is accomplished by the valve in the branches 42, in conjunction with the length and character of the cam surfaces 51—52. It is by this regulated and variable air control, and the cam surfaces 51—52, that I am able to regulate the time of setting the glass.

Heretofore, there has been no method, as far as I know, of regulating the time of setting the glass automatically. It has always required a man to do this, and it took a skilled man to know how long to keep the plunger down. In this machine the cam 50, with a little hand-cock in the branch pipe 42, does the work. The cam 50 can be changed so as to have a longer or shorter top surface 52, according to the nature of the job; whether it requires a longer or shorter time properly to set the glass in the mold. The cam and the regulating cock give a slow movement, and a regulatable movement of the plunger in one direction. The moment, however, that the bell-crank 54 rides off the rear end of the cam, a counterweight 59 reverses the valve 56 and admits air to the under side of the plunger cylinder 57, to retract the plunger from the mold. As shown in Fig. 1, 60 is the air supply pipe to valve 56; 61 is the exhaust, and 62 and 63 are the pipes which lead, respectively, to the top and bottom of the plunger cylinder 57.

The index cylinder valve 31 is operated conjunctively by the plunger cylinder by the following means: The rod of the plunger cylinder 57 extends above the top of the cylinder, and carries a bracket arm 64 (Fig. 1) to which is pivotally connected a member 65 having the pin 66. The stem of the valve 31, as seen in Fig. 5, has a crank arm 67 made in two spring-actuated sections which extend into the path of the pin 66 on the pivoted member 65. A spring 68 normally acts on the arm 67 to turn the valve in such position that live air may pass to the under side of the piston in the index cylinder, and so exert an upward pressure on the index-rod. The sections of the arm 67 are so hinged together that when the plunger 58 is sent down into the mold, the pin 66 will ride freely past the arm without actuating the valve 31; but when the plunger is moved upward, and out of, and clear of the mold, the pin 66 will engage the under side of the arm 67, and the latter, now being rigid, will cause the valve 31 to turn, and so admit air to the upper end of the index cylinder 30, and send down the index-rod. The next moment, however, the pin 66 clears the arm 67, allowing the valve 31 to resume its normal position, shown in Fig. 5, and again turning the air into the under side of the index cylinder. The index-rod, however, cannot move upward until the latch 35 is moved out of its way by the succeeding bracket 28.

The cycle of movement of the several parts of the machine is as follows: First, the main valve 17 is turned to operate the shears cylinder to close the shears and cut off the gather; second, this causes the member 27 to open the kicker cylinder valve 7, and operate the kicker 5 to turn the table; third, the table turns, releasing the latch 35, and allowing the index-rod 29 to act to stop and lock the table; fourth, the index-rod in rising turns the valve 38 to admit air through pipe 46 to the rear end of the cam cylinder 40; fifth, the cam 50 moves forward, engages the bell-crank 54, and turns the valve 56 to admit air to the top of the mold cylinder 57; sixth, the plunger 58 is thereby forced downward into the mold, and the length of time that it remains in the mold depends upon the time that it takes the bell-crank 54 to ride over the cam; seventh, as soon as the bell-crank leaves the cam, the valve 56 is reversed, the plunger rises, and in so doing turns valve 31, lets the air out of the lower end of the index cylinder, and admits air to the top of the index cylinder to withdraw the index-rod 29 from engagement with its bracket 28. The table is now in position to be revolved, and the cycle of movement repeated. If the machine is to be under the control of the gathering man, and only moved when he has had sufficient time to gather his gather and deposit in the mold, he will hit the throttle lever 16 with his gathering rod, which will open the main valve 17, actuate the shears, and start the machine going. If it is desired to make the operation of the machine entirely automatic, and force the gatherer to work up to the machine, I employ a system of compound levers 69—70, and a counterweight 71 on the lever 16 and thereby place the glass severing means under the control of the index bar in the following manner: The lever 69 is connected with the lever 70 by a link 72, and has one end arranged in the path of a collar 73 on the lower extension of the index-rod 29. The opposite end of the lever 70 is adapted to engage a projection 74 on the throttle lever 16, so that when the index-rod is released by the latch 35 and moves up to lock the table, the throttle lever 16 is lifted, turning valve 17, opening the shears, and closing the kicker cylinder valve 7. Thus the shears remain open, and they and the kicker remain inert until the index-rod is forced down again, which is done by turning the valve 31 automatically as previously described. The moment the index drops, the weight 71 is sufficient to pull down on the throttle lever 16 to turn valve 17, and so close the shears and start the machine. Thus it will be observed that the main valve may be operated automatically by using the lever connections 69—70, and counterweight 71; or it may be operated manually and periodically by hand; it only being necessary to remove the counterweight 71.

By means of this machine I am able to do away with the services of at least one skilled man; this man having previously been required to cut off the glass. With my shears I do this work automatically, and, moreover, do it with absolute uniformity. Also, by reason of the shears operating radially of the stationary mold, I center the glass in severing it, so that it drops plumb into the mold. By operating the index-bar by fluid pressure, and by the connections herein shown, its movements are synchronous with the other movements of the machine.

It is possible that various changes and modifications may be made in the construction herein shown and described, without departing from the principle of the invention, and I do not wish to be understood as limiting myself to my specific construction, or the exact means by which the desired objects of the invention are accomplished.

The machine as herein described is one that has been used in actual practice, and has successfully filled the requirements of a commercially practical machine.

Having thus described my invention, what I claim and desire to secure by Letters Patent is—

1. A machine for molding glass having in combination a traveling mold, shears, and mechanism for operating the shears, said mechanism comprising a fluid-actuated piston, said shears being fulcrumed on and carried by said piston.

2. In a glass molding apparatus, the combination of a traveling mold table, a kicker to actuate the table, fluid-pressure actuated means to operate the kicker, shears, a fluid pressure actuated piston for operating the shears, and means for automatically operating the kicker operating means coördinately with the operation of the shears said shears being fulcrumed on said piston and having a movement therewith radial to the table.

3. In a glass molding machine, the combination of a traveling mold table, fluid pressure actuated mechanism for giving the table a step by step movement, shears, mechanism for operating the shears, and means for actuating the shears coördinately with the operation of the table said mechanism for operating the shears including a fluid actuated piston on which the shears are fulcrumed.

4. In a glass molding apparatus, the combination of a traveling mold table, movable cams on the table a kicker operable on the cams to actuate the table step by step, shears, means to actuate the shears, and means for actuating the kicker coördinately with and subsequent to the operation of the shears.

5. In a glass molding apparatus, the combination of a table, molds on the table, and means for giving the table a step by step movement, said means including pivotally hung triangular cams on the under side of the table, and a kicker operable on said cams.

6. In a glass molding apparatus, the combination of a table, molds on the table, means for giving the table a step by step movement, said means including pivotally hung triangular cams on the under side of the table, and a kicker operable on said cams, said cams having a limited oscillating movement, means for operating the kicker, and a stop mechanism for limiting the rotative movement of the table.

7. In a glass molding apparatus, a main valve in combination with the following instrumentalities; to wit: shears, mold table, kicker, index, a plunger, and mechanism whereby, on the operation of the main valve, the above named instrumentalities operate automatically and coördinately, said last named mechanism including connections between the kicker and the main valve, and fluid connections between the latter and the cylinder for operating the shears.

8. In a glass molding machine, the combination with a main valve and a traveling mold, of a shears cylinder provided with shears, a kicker cylinder having a kicker, an index cylinder having an index rod, a plunger, connections between the kicker and the main valve for operating the latter, and means for operating the shears, kicker, index rod and plunger coördinately with the actuation of the main valve.

9. In a glass molding machine, a main valve and a traveling mold, in combination with the following instrumentalities to wit: a shears cylinder having shears, a kicker cylinder having a kicker to move the mold, an index cylinder having an index member to lock the mold against movement, a plunger cylinder having a plunger alinable with the mold, a cam cylinder having a cam with means to operate the plunger, and mechanism and fluid connections whereby, on the operation of the main valve, the above named instrumentalities operate automatically and coördinately.

10. In a glass molding apparatus, a main valve and a traveling mold, in combination with the following instrumentalities, to wit: glass severing mechanism, mechanism for moving the mold step by step, mechanism for checking the movements of the mold, a plunger, mechanism and fluid connections whereby, on the operation of the main valve, said mechanisms operate automatically and in the above named sequence, and mechanical means for regulating the length of time that the plunger remains in the mold.

11. In a glass molding machine, the combination with a traveling mold, of fluid pressure actuating means for moving the mold, a valve controlling the operation of said means, glass severing mechanism, and means whereby, on the operation of said glass severing mechanism, said valve is operated to move the table.

12. In a glass molding machine, the combination with a traveling mold, of fluid pressure actuated means for moving the mold, a normally closed valve controlling the operation of said moving means, shears, means for operating the shears, and means connected with said shears operating means to open said valve.

13. In a glass molding machine, the combination with a traveling mold, of fluid pressure actuated means for moving the mold, a normally closed valve controlling the operation of said moving means, shears, means for operating the shears, and means connected with said shears operating means to open said valve, said shears operating means comprising a fluid pressure cylinder, a piston-rod to which the shears are pivoted, and fixed stop members engageable by the shears on the reciprocation of the piston-rod to close and open the shears.

14. In a glass handling machine, the combination with a traveling mold, of glass severing means, means for moving the table step by step, an index-bar, and means under the control of the index-bar for operating the glass severing means automatically.

15. In a glass handling machine, the combination with a traveling mold, of glass severing means, means for moving the table step by step, an index-bar, means under the control of the index-bar for operating the glass severing means automatically, a plunger, means for operating the plunger, and means under the control of the plunger for operating the index-bar.

16. In a glass handling machine, the combination with a traveling mold, of a shears cylinder with shears, a kicker cylinder with a kicker, an index cylinder with an index-bar, a main valve controlling the admission of fluid pressure to the shears cylinder, and means under the control of the index-bar for operating said main valve.

17. In a glass handling machine, the combination with a traveling mold, of a shears cylinder with shears, a kicker cylinder with a kicker, an index cylinder with an index-bar, a main valve controlling the admission of fluid pressure to the shears cylinder, means under the control of the index-bar for operating said main valve, and other means for manually operating said valve.

18. In a glass handling machine, the combination with a traveling mold, of a shears cylinder with shears, a kicker cylinder having a kicker, an index cylinder having an index-bar, means including suitable fluid connections for operating the shears, kicker and index-bar in proper sequence, a main valve controlling the admission of fluid to one of said cylinders, and means whereby the operation of said valve may be effected.

19. In a glass molding machine, the combination of a traveling mold, means for giving the mold a step by step movement, an index-bar, a fluid pressure cylinder in which the index-bar operates, a mold plunger, and means controlled from the index-bar for operating the plunger.

20. In a glass molding machine, the combination of a traveling mold, means for giving the mold a step by step movement, an index-bar, a fluid pressure cylinder in which the index-bar operates, a mold plunger, means controlled from the index-bar for operating the plunger, and means for varying the length of time that the plunger may remain in the mold.

21. In a glass molding machine, the combination of a traveling mold, means for giving the mold a step by step movement, an index-bar, a fluid pressure cylinder in which the index-bar operates, a mold plunger, means controlled from the index-bar for operating the plunger, and means under the control of the plunger for retracting the index-bar.

22. In a glass molding machine, the combination with a mold, of a plunger, fluid pressure mechanism for operating the plunger, and means including a fluid cylinder and a cam for regulating the length of time that the plunger may remain in the mold.

23. In a glass molding machine, the combination of a mold, a plunger, fluid pressure mechanism for operating the plunger, and fluid pressure operated means for controlling the operation of the plunger.

24. In a glass molding machine, the combination of a mold, a plunger, fluid pressure mechanism for operating the plunger, fluid pressure operated means for controlling the operation of the plunger, means for giving the mold a step by step movement, an index-bar, fluid pressure means for operating the index-bar, and means controlled by the index-bar for operating said fluid pressure operated means for controlling the operation of the plunger.

25. In a glass molding machine, the combination of a mold, a plunger, fluid pressure mechanism for operating the plunger, fluid pressure operated means for controlling the operation of the plunger, means for giving the mold a step by step movement, an index-bar, fluid pressure means for operating the index-bar, means controlled by the index-bar for operating said fluid pressure operated means for controlling the operation of the plunger, and means controlled by the movements of the plunger to move the index-bar in one direction.

26. In a glass molding machine, the combination with a mold, of a plunger, a plunger cylinder, a valve controlling the admission of fluid to the cylinder, and mechanism including a cam member for operating the plunger and for varying the time that the plunger may remain in the mold.

27. In a glass molding machine, the combination with a mold, of a plunger, a plunger cylinder, a valve controlling the admission of fluid to the cylinder, a cam cylinder, a cam operated by the latter cylinder, and means whereby, on the operation of said cam in one direction, said valve is turned slowly, correspondingly to operate the plunger.

28. In a glass molding machine, the combination with a mold, of a plunger, a plunger cylinder, a valve controlling the admission of fluid to the cylinder, a cam cylinder, a cam operated by the latter cylinder, means whereby, on the operation of said cam in one direction, said valve is turned slowly, correspondingly to operate the plunger, and means for giving the valve a quick turning movement in the opposite direction.

29. In a glass molding machine, the combination with a mold, of a plunger, a plunger cylinder, an inlet valve therefor, means whereby the valve is given a slow turning movement in one direction, correspondingly to reciprocate the plunger slowly, and means for giving the valve a quick turning movement in the opposite direction.

30. In a glass molding machine, the combination with a traveling mold, of means for giving the mold a step by step movement, an index-bar, a fluid pressure cylinder for the index-bar, a plunger, a plunger cylinder, a valve controlling the fluid pressure in the plunger cylinder, and means controlled by the index-bar for operating the valve.

31. In a glass molding machine, the combination with a traveling mold, of means for giving the mold a step by step movement, an index-bar, a fluid pressure cylinder for the index-bar, a plunger, a plunger cylinder, a valve controlling the fluid pressure in the plunger cylinder, and means controlled by the index-bar for operating the valve, said last named means including a cam for giving the valve a relatively slow turning movement in one direction.

32. In a glass molding machine, the combination with a traveling mold, of means for giving the mold a step by step movement, an index-bar, a fluid pressure cylinder for the index-bar, a plunger, a plunger cylinder, a valve controlling the fluid pressure in the plunger cylinder, and means controlled by the index-bar for operating the valve, said last named means including a cam for giving the valve a relatively slow turning movement in one direction, and valve mechanism and fluid connections with the index cylinder controlled by the plunger for moving the index-bar in one direction.

In testimony whereof I have hereunto set my hand in presence of two subscribing witnesses.

FRANCIS J. MACKIN.

Witnesses:
C. N. SPIHRY,
J. P. HOLMES.